United States Patent
Alon

(10) Patent No.: US 8,594,856 B2
(45) Date of Patent: Nov. 26, 2013

(54) PROCESSOR COOLING BY TEMPERATURE RANGE AND MULTIPLE ALGORITHM FAN SPEED CONTROL

(75) Inventor: Moshe Alon, Tel Aviv (IL)

(73) Assignee: Nuvoton Technology Corporation, Hsin-Chu (TW)

( * ) Notice: Subject to any disclaimer, the term of this patent is extended or adjusted under 35 U.S.C. 154(b) by 365 days.

(21) Appl. No.: 13/027,395

(22) Filed: Feb. 15, 2011

(65) Prior Publication Data

US 2012/0209449 A1 Aug. 16, 2012

(51) Int. Cl.
*G06F 19/00* (2011.01)
(52) U.S. Cl.
USPC .............................. 700/300; 713/300; 62/186
(58) Field of Classification Search
USPC ............ 700/300; 713/300; 417/44.1; 62/186, 62/259.2; 361/679, 687, 688
See application file for complete search history.

(56) References Cited

U.S. PATENT DOCUMENTS

| | | | | |
|---|---|---|---|---|
| 6,134,667 | A * | 10/2000 | Suzuki et al. ................. | 713/300 |
| 6,873,883 | B2 * | 3/2005 | Ziarnik ......................... | 700/300 |
| 7,047,756 | B2 * | 5/2006 | Getz et al. ..................... | 62/259.2 |
| 7,167,778 | B2 * | 1/2007 | Yazawa et al. ................ | 700/300 |
| 7,483,270 | B2 * | 1/2009 | Blake ........................ | 361/679.48 |
| 7,583,043 | B2 * | 9/2009 | Chung et al. .................. | 318/634 |
| 7,630,856 | B2 | 12/2009 | Rockenfeller et al. | |
| 8,266,461 | B2 * | 9/2012 | Ziarnik et al. ................ | 713/300 |
| 2005/0174737 | A1 * | 8/2005 | Meir ............................. | 361/697 |
| 2007/0076372 | A1 | 4/2007 | Lin | |
| 2007/0296408 | A1 | 12/2007 | Liao et al. | |
| 2009/0167228 | A1 * | 7/2009 | Chung et al. .................. | 318/455 |
| 2009/0296342 | A1 * | 12/2009 | Matteson et al. ........ | 361/679.46 |

OTHER PUBLICATIONS

Benson Inkley: "Digital Thermal Sensors and the DTS based Thermal Specification for the Intel® Core™ i7 Processor (Bloomfield)", Intel® Microarchitecture (Larrabee) Technical Marketing, 36 slides.

* cited by examiner

*Primary Examiner* — Kidest Bahta
(74) *Attorney, Agent, or Firm* — D Kligler I. P. Services Ltd.

(57) ABSTRACT

A method of controlling cooling of a processor, including monitoring at least one parameter of a current status of the processor and determining in which of a plurality of value ranges the at least one parameter of the current status of the processor is located. If the at least one parameter is located in a first range, determining a first desired value for a cooling parameter, based on the processor temperature, using a first method, determining a second desired value for the cooling parameter, based on the processor temperature, using a second method, in which the value of the cooling parameter increases, in a manner indicating more cooling, from a low value for a low processor temperature to a higher value for a higher processor temperature and selecting a value of the cooling parameter as a function of the first and second desired values. If the at least one parameter is located in a second range, selecting a value of the cooling parameter of the processor using a third method, based on the processor temperature. Further controlling a cooling unit of the processor according to the selected value of the cooling parameter; and repeating periodically the monitoring, range determination, value selection and controlling.

23 Claims, 3 Drawing Sheets

PROCESSOR COOLING BY TEMPERATURE RANGE AND MULTIPLE ALGORITHM FAN SPEED CONTROL

FIELD OF THE INVENTION

The present invention relates generally to control systems and specifically to controlling the temperature of processors.

BACKGROUND

Modern processors operate at very high processing rates and in so doing generate large amounts of heat which must be dissipated to prevent overheating of the processor which can result in damage to the processor. Generally, a fan is used to dissipate the heat and prevent overheating of the processor. In order to avoid fan noise and waste of energy in operating the fan itself, it is desired to control the speed of the fan according to the required extent of heat dissipation. It has been suggested to control the fan speed in accordance with the power consumption of the processor.

However, determining the power consumption of the processor is not always simple and in some cases it is desirable to control the fan operation without knowledge of the power consumption of the processor.

The decision on the speed of the fan in the relatively low power consumption range is governed by two competing considerations. On the one hand, it is desired to use as low as possible fan speed in order to reduce power consumption of the fan. On the other hand, it is desired to make sure that the temperature of the processor does not exceed a temperature threshold.

SUMMARY OF THE INVENTION

An aspect of some embodiments of the present invention relates to a method of temperature control of a processor, in which a controller calculates a desired parameter of a cooling unit (which in the following application refers broadly also to heat dissipation units, such as fans), such as a fan speed, using at least two different algorithms for at least a portion of the operation range of the processor, and selects the actual fan speed used as a function of the values calculated by the different algorithms. While using two different algorithms in tandem makes the control task more complex, this is considered, in accordance with an aspect of the present invention, to be outweighed by the advantages of achieving a more optimal control, especially in view of the limited information available to the controller.

In some embodiments of the invention, the actual fan speed at any time is selected as the speed calculated by one of the algorithms, for example the lower speed. Optionally, a first one of the algorithms is directed at minimizing the fan speed while still meeting temperature limitations, optionally taking into account not only the current temperature, but also the temperature history and/or an estimate of the future history. In some embodiments, the first algorithm at least partially depends on the derivative of the temperature, such as a proportional Integral Derivative (PID) method or variations thereof, and/or at least partially depends on an integral of the temperature or on the time for which the processor is at the current temperature or meets specific conditions. A second algorithm is optionally directed at achieving a smooth operation of the fan without abrupt speed changes of the fan and/or temperature overshoots of the processor. In some embodiments, the second algorithm defines for every processor temperature level, a maximal speed which may be used.

In some embodiments of the invention, the use of two different algorithms is applied by the controller only over a portion of the operation range of the processor. Optionally, the two different algorithms are used only when the temperature of the processor is below a specific temperature threshold and/or when the power consumption of the processor is below a predetermined threshold. The two algorithms may be used to ensure a smooth transition between the control schemes used in the different portions of the operation ranges of the processor.

There is therefore provided in accordance with an embodiment of the present invention, a method of controlling cooling of a processor, comprising monitoring at least one parameter of a current status of the processor, determining in which of a plurality of value ranges the at least one parameter of the current status of the processor is located.

If the at least one parameter is located in a first range, determining a first desired value for a cooling parameter, based on the processor temperature, using a first method, determining a second desired value for the cooling parameter, based on the processor temperature, using a second method, in which the value of the cooling parameter increases, in a manner indicating more cooling, from a low value for a low processor temperature to a higher value for a higher processor temperature, selecting a value of the cooling parameter as a function of the first and second desired values. If the at least one parameter is located in a second range, selecting a value of the cooling parameter of the processor using a third method, based on the processor temperature. The method further includes controlling a cooling unit of the processor according to the selected value of the cooling parameter and repeating periodically the monitoring, range determination, value selection and controlling.

Optionally, the at least one parameter of the current status of the processor comprises the processor temperature and/or the processor power utilization. Optionally, values of the at least one parameter in the first range are all lower than the values of at least one parameter in the second range. Optionally, determining the second desired value comprises determining responsive to the processor temperature and a value of the cooling parameter which would be selected by the third method for the current processor conditions except that the processor temperature would be the highest temperature of the first range.

Optionally, determining the second desired value comprises determining responsive to the processor temperature, a value of the cooling parameter which would be selected by the third method for the current processor conditions except that the processor temperature would be the highest temperature of the first range, and at least one predetermined correlation between the processor temperature and the cooling parameter, in which the cooling parameter gradually increases from a low value for a lowest processor temperature of the first range to a high value for the highest temperature of the first range.

Optionally, the cooling parameter in the at least one predetermined correlation monotonously increases from a low value for a lowest processor temperature of the first range to a high value for the highest temperature of the first range.

Optionally, determining the second desired value is responsive to an ambient temperature. Optionally, determining the second desired value is responsive to a value of the cooling parameter which would be selected by the third method for the current processor conditions for the lowest temperature of the second range. Optionally, the second desired value at a transition point between the first and second ranges is equal to the value provided by the third method at the transition point. Optionally, the second desired value at a transition point between the first and second ranges is close, up to a difference of 20%, up to a difference of 10% or up to a difference of 5%, to the value provided by the third method at the transition point. Optionally, the cooling parameter comprises a fan speed.

Optionally, determining the first desired value comprises determining using a control method which is at least partially based on an estimate of future trends of the processor temperature. Optionally, determining the first desired value comprises determining using a control method which is at least partially based on previous values of the processor temperature. Optionally, determining the first desired value comprises determining using a PID control method. Optionally, determining the first desired value comprises determining using a method dependent directly only on the processor temperature. Optionally, determining the first desired value comprises determining using a control method designed to keep the processor temperature below a target temperature value. Optionally, selecting a value of the cooling parameter of the processor using the third method comprises selecting responsive to the processor temperature and an ambient temperature.

Optionally, selecting a value of the cooling parameter as a function of the first and second desired values comprises selecting the lower or the higher of the first and second desired values. Alternatively, selecting a value of the cooling parameter as a function of the first and second desired values comprises selecting an average of the first and second desired values.

There is further provided in accordance with an embodiment of the present invention, temperature controller of a cooling parameter of a processor, comprising:

an input interface adapted to receive at least one parameter of the processor, including a current temperature; and a control unit adapted to periodically determine in which of a plurality of value ranges, a specific one of the received at least one parameter is located;

if the at least one parameter is located in a first range:
to determine a first desired value for the cooling parameter, based on the processor temperature, using a first method;
to determine a second desired value for the cooling parameter, based on the processor temperature, using a second method; and
to select a value of the cooling parameter as a function of the first and second desired values;

if the at least one parameter is located in a second range, selecting a value of a cooling parameter of the processor using a third method, based on the processor temperature; and to control a cooling unit of the processor according to the selected value of the cooling parameter.

BRIEF DESCRIPTION OF THE FIGURES

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention; the description taken with the drawings making apparent to those skilled in the art how the several forms of the invention may be embodied in practice. In the accompanying drawings.

DESCRIPTION OF THE PREFERRED EMBODIMENTS

Figure 1:
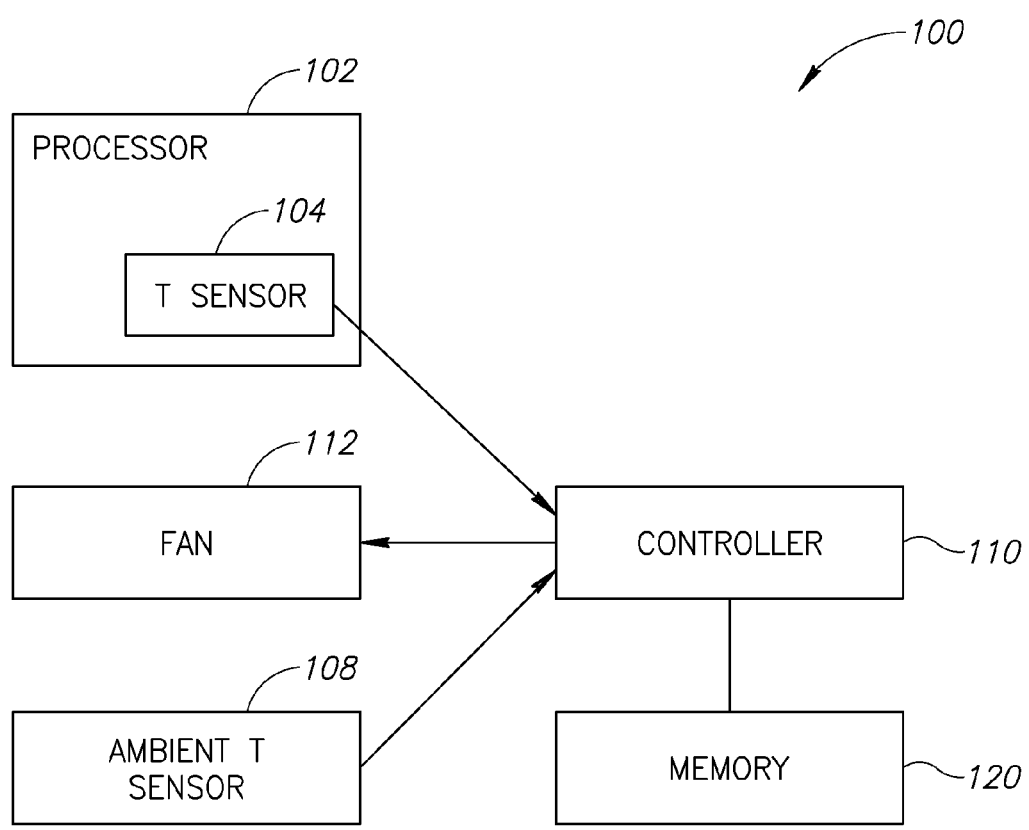
FIG. 1 is a simplified schematic block diagram of a computer, in accordance with an embodiment of the invention.

FIG. 1 is a schematic block diagram of a computer 100, in accordance with an embodiment of the invention. Only elements relating to the present discussion are shown. Computer 100 includes a processor 102, and a fan 112 directed at processor 102 or a heat sink thereof, in order to dissipate heat generated by the processor 102. Processor 102 has at least one temperature or heat sensor 104, such as a thermocouple, whose readings $T_{processor}$ are transferred to a controller 110, in data communication therewith. Controller 110 also receives readings $T_{ambient}$ from an ambient temperature sensor 108 positioned in a casing of computer 100, which indicates the temperature of the air drawn in by fan 112 and used by the fan in dissipating heat from processor 102. Based on the received readings, $T_{processor}$ and $T_{ambient}$, controller 110 controls the speed of fan 112. A memory 120 may be used by controller 110 for storing values used in controlling the speed of fan 112. Memory 120 may be a general memory of processor 102 or a separate memory either dedicated for use by controller 110 for fan control or possibly additionally for other tasks.

It is noted that while a fan is discussed in the following description of embodiments, the control principles discussed herein may be used with other heat dissipation and/or cooling units (referred to herein broadly as "cooling units"), such as blowers and multi-fan units. The term "cooling parameter" is used in the present application and claims to refer to any parameter of the heat dissipation or cooling units.

Figure 2:
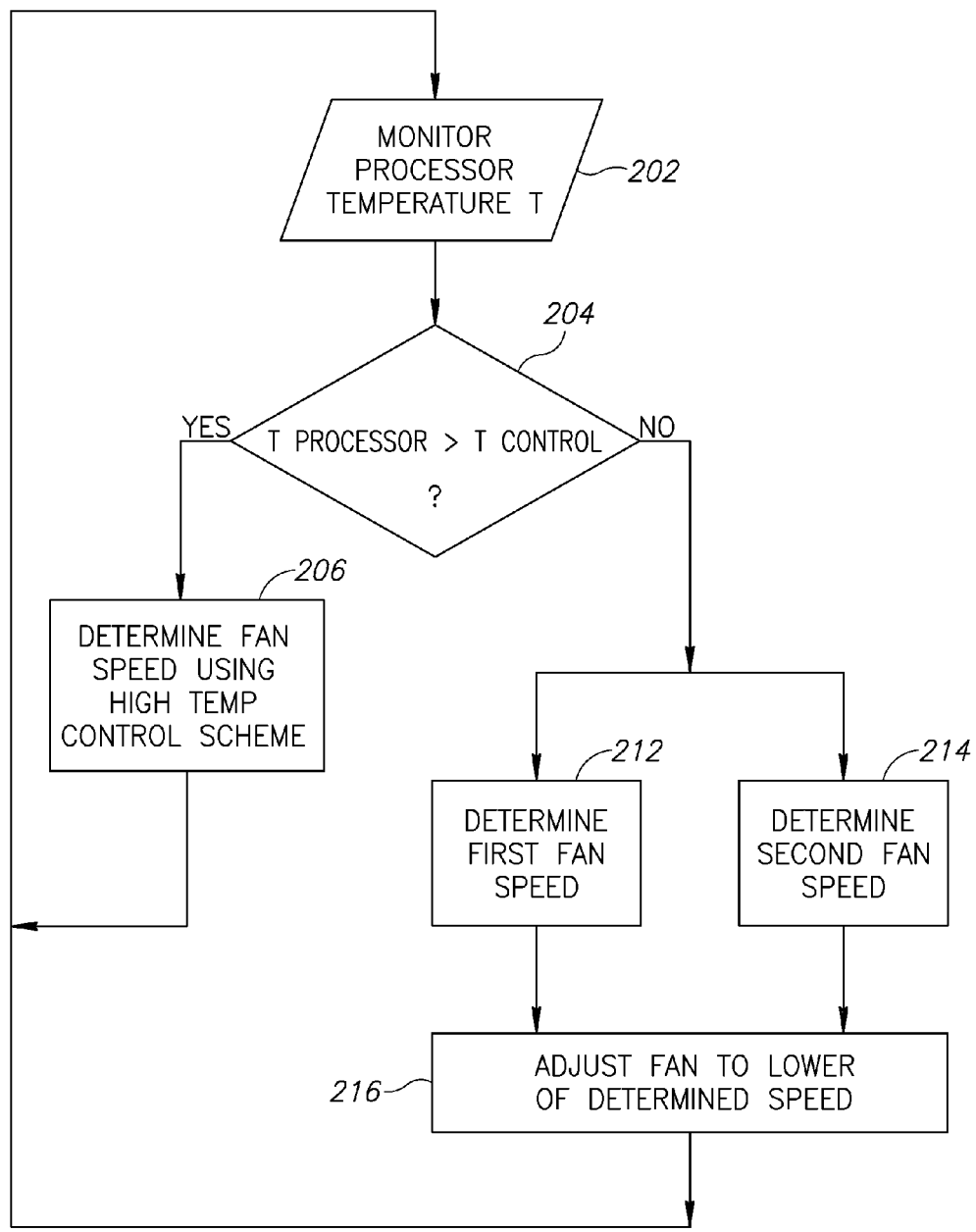
FIG. 2 is a flowchart of acts performed by a temperature controller, in accordance with an embodiment of the invention.

FIG. 2 is a flowchart of acts performed by controller 110, in accordance with an embodiment of the invention. Controller 110 optionally continuously monitors (202) the temperature ($T_{processor}$) monitored by sensor 104 to determine an operation temperature of processor 102. If (204) $T_{processor}$ is above a predetermined temperature threshold ($T_{control}$), controller 110 optionally determines (206) a fan speed in accordance with a high-temperature control scheme. In some embodiments, the high-temperature control scheme is specified by a manufacturer of processor 102 and depends on the current processor temperature $T_{processor}$, and the current ambient temperature $T_{ambient}$. If (204), however, the temperature of processor 102 ($T_{processor}$) is below the predetermined threshold, controller 110 determines the fan speed based on a dual control scheme as is now described. Controller 110 determines (212) a first desired fan speed based on the processor temperature measured by processor temperature sensor 104. Controller 110 also determines (214) a second desired fan speed directed at achieving a smooth operation of the fan over time. Fan 112 is then adjusted (216) to rotate at the lower of the first and second desired speeds.

Optionally, the first desired fan speed is determined (212) by a control algorithm directed at optimizing between a plurality of different constraints, for example, directed at minimizing the speed of fan 112 while keeping the processor temperature below a predetermined temperature threshold. In some embodiments, the first desired fan speed is determined by the proportional integral derivative (PID) algorithm.

Optionally, a target temperature slightly below the temperature threshold is used with the PID algorithm, in order to prevent abrupt speed changes. In some embodiments of the invention, the first desired fan speed is determined, for simplicity, based on the readings of temperature sensor 104 without using readings from other sensors. Alternatively, the first desired fan speed may be determined based on a plurality of inputs, for example with both the processor temperature and the ambient temperature.

Figure 3:
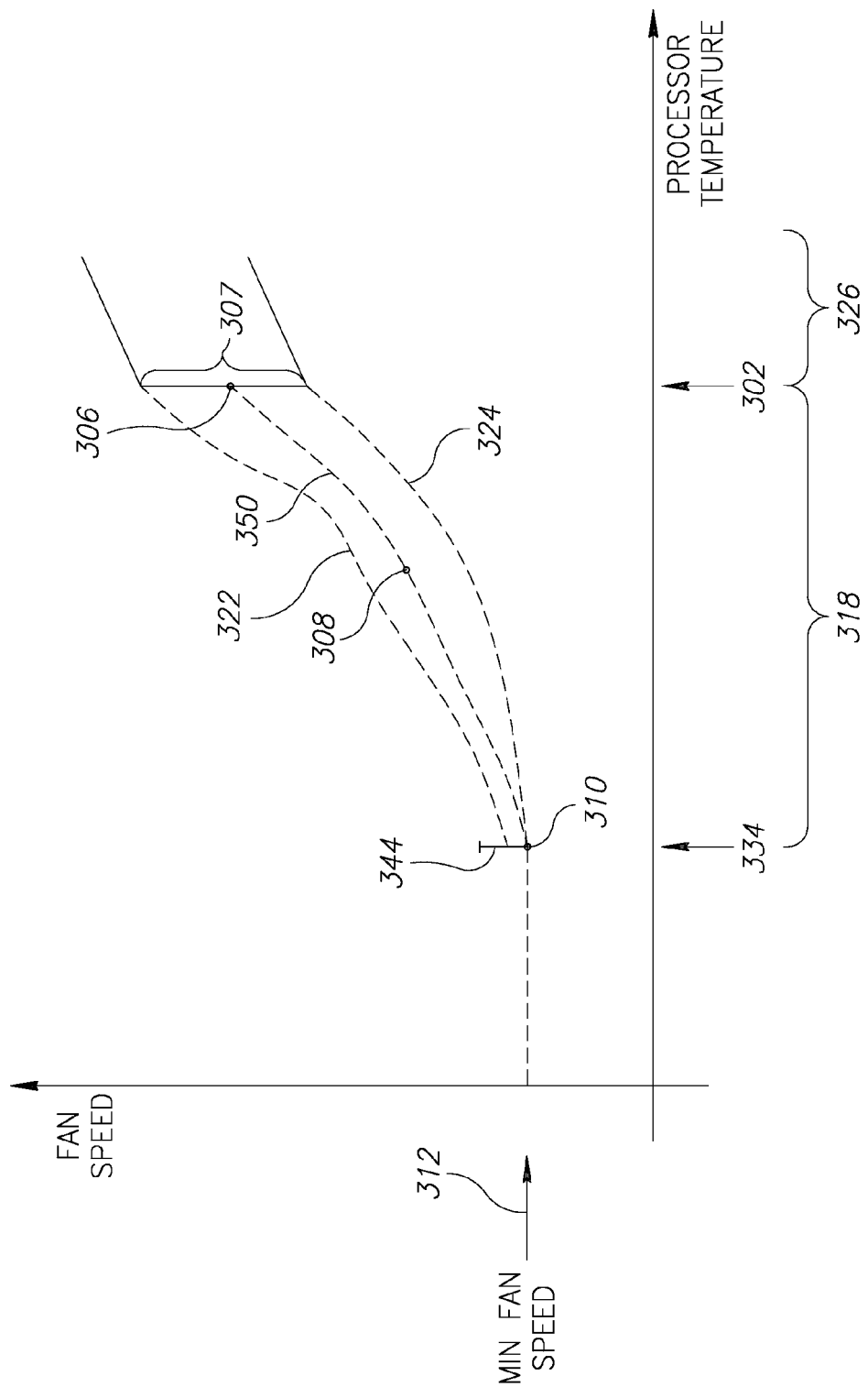
FIG. 3 is a graph useful in illustrating a method of determining a desired fan speed, in accordance with an embodiment of the invention.

FIG. 3 is a graphical representation of the relationship between fan speed and processor temperature that is useful in illustrating a method of determining (214) the second desired fan speed, in accordance with an embodiment of the invention. The determination (214) of the second desired fan speed (indicated by point 308) optionally includes defining a curve 350 representing a maximal fan speed for a range 318 of processor temperatures, between a low temperature 334 and the temperature threshold ($T_{control}$) 302, in which the fan control is governed by the dual control scheme. The determination (214) of the second desired fan speed optionally includes determining the fan speed corresponding to the current temperature on the defined curve 350.

The defining of the curve 350 optionally includes selecting beginning and end fan speeds for temperature range 318. The beginning and end speeds are represented in FIG. 3 by points 310 and 306, respectively. The end speed 306 is optionally selected as the fan speed which would be selected by determination (206) of the high-temperature control scheme, thus providing a smooth transition between temperature region 318 and a region 326, in which the fan speed is controlled by the high-temperature control scheme.

The end speed point 306 could be at substantially any point along segment 307 and beginning point 310 may be at substantially any point along a segment 344, depending on various parameters. In some embodiments, the beginning speed 310 and/or end speed 306 are determined based on the current ambient temperature, the altitude, humidity, air density and/or other environment parameters. In some embodiments of the invention, end point 306 is selected based on the ambient temperature and beginning point 310 is selected based on the relative position of point 306 on segment 307. In other embodiments of the invention, beginning point 310 is set at a predetermined fan speed value regardless of the environment parameter values and the position of end point 306.

In some embodiments of the invention, curve 350 is defined as a linear line connecting beginning point 310 to end point 306. Alternatively, curve 350 has a different shape, such as a parabolic shape or some other concave shape. Optionally, the fan speed of curve 350 increases monotonously with the temperature or at least does not decrease from lower to higher temperatures. In some embodiments of the invention, the fan speed increases substantially along curve 350 from low temperature 334 to temperature 302, for example increasing by at least 50%, at least 100% or even by at least 150%. It is noted that in some embodiments, curve 350 could include flat areas in which the fan speed does not change over a substantially long term, possibly more than 5%, more than 10% or even more than 20% of range 318. Optionally, the speed of the fan is kept constant at the higher temperatures of range 318.

In one embodiment, curve 350 is calculated by interpolation between a predetermined high graph 322 and a predetermined low graph 324, according to the location of end point 306 along segment 307. As shown, in some embodiments, high graph 322 ends at the highest fan speed along segment 307 and low graph 324 ends at the lowest fan speed along segment 307. Predetermined graphs ending at other points along segment 307 may be used in addition to graphs 322 and 324 or instead of graphs 322 and/or 324 for interpolation or extrapolation. In some embodiments of the invention, more than two predetermined graphs are provided for different points along segment 307 and/or for different points along segment 344 and a specific curve 350 is determined based on a closest curve to the current conditions or two closest curves to the current conditions.

It is noted that instead of calculating the entire curve 350, point 308 is calculated directly from the predetermined graphs.

Optionally, graphs 322 and 324 are determined based on lab tests performed by a manufacturer of computer 100 and/or controller 110, in an attempt to achieve an optimal operation which minimizes fan power consumption while preventing abrupt speed changes. In some embodiments, graphs 322 and/or 324 depend on heat sink characteristics of computer 100, fan type, and CPU power consumption of processor 102 and thermal characteristics of computer 100 and its elements. Graphs 322 and 324 may be defined numerically by a plurality of points along the graphs or may be defined analytically by a proper equation.

Alternatives

In some embodiments of the invention, in addition to receiving temperature readings, controller 110 receives power consumption readings from processor 102. The power consumption readings may be used in selecting beginning point 310 and/or end point 306. Alternatively or additionally, instead of the transition between region 318 in which the fan speed is governed by the dual control scheme and region 326 in which the fan speed is governed by the high temperature control scheme, being dependent on processor temperature, as indicated by block 204 (FIG. 2), the transition may be governed by other parameters, such as processor power.

Instead of adjusting (116) the speed of fan 112 to the lower of the determined first and second speeds, other functions may be applied to the first and second speeds to determine the actual speed of the fan. For example, in some embodiments, the higher speed is selected. In such embodiments, curves 350 are defined accordingly to relate to relatively low speeds. In still other embodiments, the actually used speed is a weighted average of the first and second determined speeds.

It will be appreciated that the above described description of methods and apparatus are to be interpreted as including apparatus for carrying out the methods and methods of using the apparatus. It should be understood that, where appropriate, features and/or steps described with respect to one embodiment may be used with other embodiments and that not all embodiments of the invention have all of the features and/or steps shown in a particular figure or described with respect to a specific embodiment. Variations of embodiments described will occur to persons of the art.

It is noted that at least some of the above described embodiments include non-limiting details which were provided by way of example for illustration purposes and/or to describe the best mode contemplated by the inventors and therefore may include structure, acts or details of structures and acts that are not essential to the invention. Structure and acts described herein are replaceable by equivalents known in the art, which perform the same function, even if the structure or acts are different. Many alternative implementation details may be used. Therefore, the scope of the invention is limited only by the elements and limitations as used in the claims, wherein the terms "comprise," "include," "have" and their conjugates, shall mean, when used in the claims, "including but not necessarily limited to."

The invention claimed is:

1. A method of controlling cooling of a processor, comprising:
monitoring at least one parameter of a current status of the processor;
determining in which of a plurality of value ranges the at least one parameter of the current status of the processor is located;
such that if the at least one parameter is located in a first range:
determining a first desired value for a cooling parameter, based on the processor temperature, using a first method;
determining a second desired value for the cooling parameter, based on the processor temperature, using a second method, in which the value of the cooling parameter increases, in a manner indicating more cooling, from a low value for a low processor temperature to a higher value for a higher processor temperature;
selecting a value of the cooling parameter as a function of the first and second desired values;
whereas if the at least one parameter is located in a second range, selecting a value of the cooling parameter of the processor using a third method, based on the processor temperature; and
controlling a cooling unit of the processor according to the selected value of the cooling parameter; and
repeating periodically the monitoring, range determination, value selection and controlling.

2. The method of claim 1, wherein the at least one parameter of the current status of the processor comprises the processor temperature.

3. The method of claim 1, wherein the at least one parameter of the current status of the processor comprises the processor power utilization.

4. The method of claim 2, wherein values of the at least one parameter in the first range are all lower than the values of the at least one parameter in the second range.

5. The method of claim 4, wherein determining the second desired value comprises determining a border value for the cooling parameter using the third method, for the highest temperature of the first range and otherwise the current processor conditions and wherein the second desired value is determined responsive to the processor temperature and the determined border value.

6. The method of claim 5, wherein determining the second desired value comprises determining responsive to the processor temperature, the border value, and at least one predetermined correlation between the processor temperature and the cooling parameter, in which the cooling parameter gradually increases from a low value for a lowest processor temperature of the first range to a high value for the highest temperature of the first range.

7. The method of claim 6, wherein the cooling parameter in the at least one predetermined correlation monotonously increases from a low value for a lowest processor temperature of the first range to a high value for the highest temperature of the first range.

8. The method of claim 1, wherein determining the second desired value comprises determining responsive to an ambient temperature.

9. The method of claim 8, wherein determining the second desired value comprises determining responsive to a value of the cooling parameter which would be selected by the third method for the current processor conditions for the lowest temperature of the second range.

10. The method of claim 8, wherein the second desired value at a transition point between the first and second ranges is equal to the value provided by the third method at the transition point.

11. The method of claim 1, wherein the second desired value at a transition point between the first and second ranges is close, up to a difference of 20%, to the value provided by the third method at the transition point.

12. The method of claim 1, wherein the cooling parameter comprises a fan speed.

13. The method of claim 1, wherein determining the first desired value comprises determining using a control method which is at least partially based on an estimate of future trends of the processor temperature.

14. The method of claim 13, wherein determining the first desired value comprises determining using a control method which is at least partially based on previous values of the processor temperature.

15. The method of claim 14, wherein determining the first desired value comprises determining using a PID control method.

16. The method of claim 1, wherein determining the first desired value comprises determining using a method dependent directly only on the processor temperature.

17. The method of claim 16, wherein determining the first desired value comprises determining using a control algorithm designed to minimize the cooling parameter while keeping the processor temperature below a target temperature value.

18. The method of claim 1, wherein selecting a value of the cooling parameter of the processor using the third method comprises selecting responsive to the processor temperature and an ambient temperature.

19. The method of claim 1, wherein selecting a value of the cooling parameter as a function of the first and second desired values comprises selecting the lower of the first and second desired values.

20. The method of claim 1, wherein selecting a value of the cooling parameter as a function of the first and second desired values comprises selecting the higher of the first and second desired values.

21. The method of claim 1, wherein selecting a value of the cooling parameter as a function of the first and second desired values comprises selecting an average of the first and second desired values.

22. A temperature controller of a cooling parameter of a processor, comprising:
an input interface adapted to receive at least one parameter of the processor, including a current temperature; and
a control unit adapted to periodically determine in which of a plurality of value ranges, a specific one of the received at least one parameter is located;
if the at least one parameter is located in a first range:
to determine a first desired value for the cooling parameter, based on the processor temperature, using a first method;
to determine a second desired value for the cooling parameter, based on the processor temperature, using a second method, in which the value of the cooling parameter increases, in a manner indicating more cooling, from a low value for a low processor temperature to a higher value for a higher processor temperature; and
to select a value of the cooling parameter as a function of the first and second desired values;

if the at least one parameter is located in a second range, selecting a value of a cooling parameter of the processor using a third method, based on the processor temperature; and to control a cooling unit of the processor according to the selected value of the cooling parameter.

23. The method of claim 15, wherein determining the second desired value comprises determining responsive to at least the processor temperature, and at least one predetermined correlation between the processor temperature and the cooling parameter, in which the cooling parameter gradually increases from a low value for a lowest processor temperature of the first range to a high value for the highest temperature of the first range.

\* \* \* \* \*